United States Patent Office 2,730,484
Patented Jan. 10, 1956

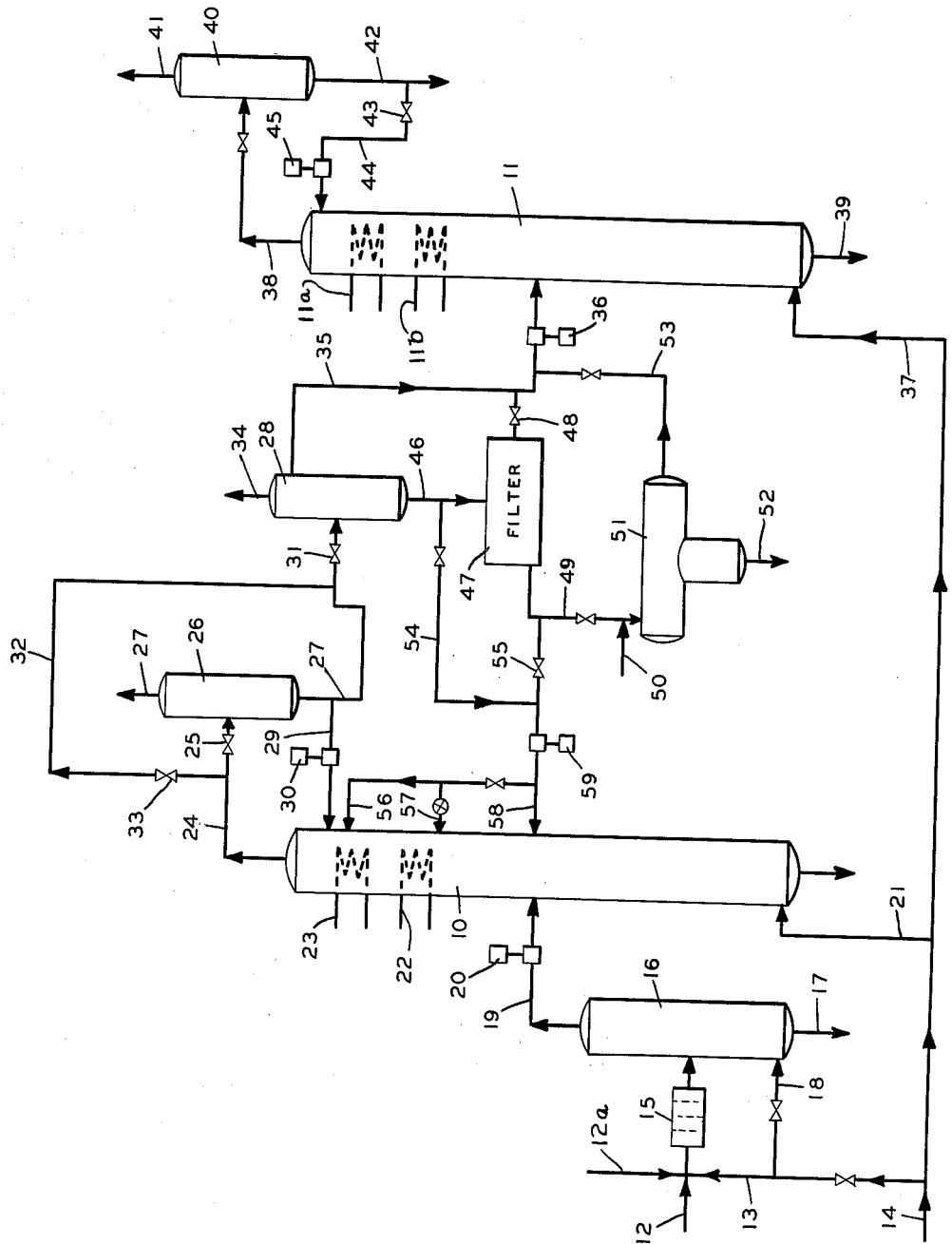

2,730,484

VITAMIN CONCENTRATION BY DESTEARINIZING BETWEEN SUCCESSIVE EXTRACTIONS WITH A PARACRITICAL SOLVENT

Herbert J. Passino, Englewood, N. J., assignor to The M. W. Kellogg Company, Jersey City, N. J., a corporation Application April 6, 1951, Serial No. 219,672

5 Claims. (Cl. 167—81)

This invention relates in general to an improved method for preparing high potency vitamin concentrates from low potency vitamin-containing oils such as menhaden oil, cod liver oil, or the like.

This application is a continuation-in-part of my U. S. patent application Serial No. 17,556, filed March 27, 1948, now abandoned.

The method employs an initial extraction of substantially all the vitamins from the oil with a low-boiling solvent under superatmospheric pressure and at temperatures lying within a range of temperatures near the critical temperature of the solvent-oil mixture in which miscibility of the solvent and the oil decreases as the critical temperature is approached. The extract phase obtained is rectified with a counter-currently flowing oil phase as described herein and chilled to precipitate stearin; the elimination of the stearin radically alters the solubility relationship between the solvent, the vitamins, and the non-vitamin components, and further extraction of the destearinized extract produces a second extract phase substantially more concentrated than the first extract phase. In its broadest sense, the present invention deals with the production of high potency vitamin concentrates from a low potency material containing relatively high melting point wax-like substances and capable of being subjected to solvent extraction of the type herein described; such a material might be derived from fish, animal, or vegetable sources or might even be the product of synthesis rather than of nature. However, in its immediate and preferred application, the invention is designed primarily for dealing with commercial marine oils such as fish liver oil and fish body oils, which constitute the most fruitful source of fat soluble vitamins, but present problems of concentration. These include liver oils, such as those of the cod and halibut, which are sources of vitamins A and D, and various shark liver oils which are sources principally of vitamin A. The various fish body oils also may be treated to produce concentrates of vitamins A and D. Among the latter oils are those derived from menhaden, herring, sardines, and the like.

Vitamin-containing oil may be treated to produce concentrates thereof at relatively low temperatures by means of solvents for such oils, or portions thereof, whose miscibility with the oils decreases with increasing temperature. Such solvents ordinarily are normally gaseous and must be employed under conditions of substantial superatmospheric pressure in order to provide the required degree of miscibility of the solvent with the vitamin oil. The solvent and vitamin oil are contacted under sufficient superatmospheric pressure and at a temperature effective to cause the formation of two homogeneous mixtures of the solvent and the oil which represent immiscible liquid phases of differing densities. The lighter phase consists principally of the solvent and an extract portion of the oil. The heavy phase consists of the remainder of the oil and a small proportion of the solvent. It is found that the separation of the oil in this manner may be used to concentrate the vitamins in the extract phase. For example, in the treatment of various fish oils containing vitamin A or vitamin D, it is found that the fraction of the oil contained in the lighter phase is concentrated in these vitamins as compared to the original oil. In this way, most vitamin-containing oils occurring in commercial quantity can be treated to extract a concentrate having as much as 30 times the concentration of the original oil; however, trouble is encountered in concentrating certain oils twenty-fold or more. Greater concentrations can be accomplished, but as the concentration increases, the difficulties and, therefore, the cost increases even more rapidly until, in the case of many oils, a limit is reached at about 50 to 1 concentration, although this varies a little from oil to oil. Moreover, the recovery of vitamins from oil declines as higher concentration is attempted so that maximum concentration is accompanied by the loss of vitamins in the heavy phase such that the process usually becomes uneconomic. These limitations on the concentration of vitamins which can be achieved by the solvent fractionation process are caused to a substantial degree by the presence of substantial percentages of normally solid fats. Although many of these are substantially less soluble than the vitamins and are, therefore, readily separated into the heavy phase by the solvent fractionation process, others, such as certain light stearins, have substantially the same solubility as the vitamins and in some cases are more soluble.

For example, it is extremely desirable from an economic point of view to provide vitamins A and D in concentrates of 200,000 to 400,000 U. S. P. units or more. Since large quantities of the marine oils containing these vitamins have a potency of 2,000 U. S. P. units or less, it is necessary to achieve a concentration of one hundred to one or better. The preparation of such a concentrate, therefore, requires the separation of substantially all the vitamins in not more than one per cent of the oil. If this is to be accomplished by solvent fractionation, it is necessary that the lighter or extract phase contain only one per cent of the original oil by weight. When this is attempted with certain commercial oils, however, it is found that a one per cent extract does not even closely approach 100 concentrations of the vitamin content of the original oil. Instead of obtaining potencies in the order of 200,000 units a one per cent extract may be found to have a potency of less than 100,000–120,000 units. Indeed, a two per cent extract may have a slightly higher potency than that of the one per cent extract. This fact indicates that there are some constituents in the oil which are more soluble than are vitamins A and D. When a one per cent extract is separated from the original oil, certain more soluble non-vitamin fractions displace a substantial portion of the vitamins into a raffinate phase. If the extract phase is increased to separate a two per cent extract from the original oil, the concentration of the extract is greater and the recovery of vitamins from the oil is often more than doubled. This reveals the existence of one or more constituents of the original oil which are more soluble than the vitamins and which comprise less than one per cent of the original oils. This discovery contradicts the widely-held belief that the most soluble components of such oils in the solvents disclosed herein are the vitamins. In order to obtain economic recoveries, it has been necessary to increase the percentage of the original oil separated into extract phase to a range between 3 and 8 per cent. While this increase in the percentage of extract results in satisfactory vitamin recovery, it also greatly increases the amount of non-vitamin materials in the extract; it is apparent from these results that high potency concentrates cannot be obtained from many of the commercially available low-potency oils by means of the solvent fractionation process alone.

Various steps may be taken to supplement the single solvent fractionation process in order to achieve greater concentrations. In some cases, a second solvent fractionation is satisfactory; but in the case of some of the low-potency oils, a concentration greater than 50:1 cannot be recovered regardless of how many solvent fractionation steps are employed.

A very important reason for the failure of the vitamins to be concentrated further by repeated solvent fractionations is that vitamins in the extract phase are in solution not merely in the low-boiling solvent, but in a mixed solvent comprised not only of low-boiling solvent but also of stearin and other soluble oil components, which may be referred to as the non-vitamin component. The present invention provides for radically altering the solubility equilibrium relationships between the components of the first extract phase by chilling out the stearin. When the stearin has been separated, the first extract phase, now destearinized, may be again extracted with the same solvent but with very different fractionation effects. In the absence of the stearin, vitamins are concentrated much more readily than in its presence, apparently because the non-vitamin component is relatively more soluble in a stearin-propane-vitamin oil mixture than in a propane-vitamin oil mixture, whereas the vitamin oil is relatively more soluble in propane than in a propane, stearin, non-vitamin component mixture. Another and much less important concentrating effect of the absence of the stearin in the final concentrate results from the reduction in volume of that concentrate without a corresponding reduction in the total vitamin content thereof. The inherent limitations of the latter effect are obvious, in view of the fact that the more soluble stearin components amount to less than 1% of the total charge oil. Thus it is not surprising to find that the results of the present invention cannot be obtained by a concentration process consisting of an extreme solvent fractionation in which the extract phase is very small followed by a step of destearinizing the extract. Nor will destearinization of the low potency oil first followed by one or more solvent fractionations produce the desired effect. In this instance, the mass of stearin precipitated by the chilling comprises chiefly the constituents of higher melting point while the more soluble lighter compounds of lower melting point remain in solution in the oil.

Other attempts to solve the problem of concentrating vitamin A materials have had only limited success. Fairly high vitamin A concentrates, that is of the order of 100,000 U. S. P. units per gram, have been prepared by saponification methods, but such processes convert all of the vitamin A ester into vitamin A alcohol. This conversion is highly undesirable since vitamin A alcohol is far less stable than the ester; hence the vitamin A alcohol concentrate is far more subject to loss of vitamin potency. Molecular distillation on the other hand retains the vitamin compounds in the same form as in the low potency oil; however, twenty to thirty-fold concentrations appear to be the maximum feasible by this means. Thus, there exists a wide-spread need for a concentration process having the capabilities of the present invention.

An object of the invention is to provide a method for the preparation of high vitamin concentrates from vitamin-containing oils of low potency.

Another object of the invention is to provide a method for the preparation of high vitamin concentrates from vitamin-containing oils of low potency with only minor losses of vitamins.

A further object of the invention is to provide a method for the preparation of high vitamin A concentrates from vitamin A-containing oils of low potency in which the vitamin A compounds retain their original form.

Still another object of the invention is to provide a method for the preparation of a higher potency fat-soluble vitamin concentrate than was heretofore obtainable from vitamin-containing oils of low potency.

A still further object of the invention is to provide a method for the preparation of a higher potency vitamin A concentrate than was heretofore obtainable from low-potency vitamin A-containing marine oils in good yields and without either substantial conversion of vitamin A ester to vitamin A alcohol or uneconomic losses of vitamin A.

In broad outline the novel process comprises three steps: (1) a first solvent fractionation to concentrate in the overhead or extract phase most of the vitamin content of the original oil. Since a high recovery of vitamins somewhat limits the degree of concentration obtained in this first fractionation, the overhead fraction seldom needs be greater than 10 weight per cent of the charge oil. The larger the overhead, the larger the destearinizing capacity required; therefore it is recommended that the overhead in this stage should be no larger than is necessary to concentrate substantially all of the vitamins in this fraction. (2) All or part of the extract phase is chilled, preferably in a combined chiller and settler, to separate most of the oil from precipitated high melting point substances, principally stearin. The precipitated stearin is filtered and, in a preferred embodiment, repulped or washed to extract the last of the vitamin-containing oil from the high melting point substances. In still another alternative embodiment all or a portion of the stearin may be recycled to the first solvent fractionation step for recovery of the vitamins therein. (3) Concentrated vitamin oil separated from the high melting point substances is now subjected to a second solvent fractionation under a different set of conditions from the first, in order to obtain a more highly concentrated vitamin extract. In this second solvent fractionation the charge oil is generally about 20 to 30 times the concentration of the original oil; it is free of substantially high melting point components whether soluble or insoluble in the solvent; it is decolorized; most importantly it has a new solubility equilibrium with the propane and is therefore adapted to solvent fractionation of considerable discrimination within narrow temperature ranges in order to obtain an extract of relatively high vitamin potency and a raffinate which contains in fairly concentrated form substantially all vitamins not recovered in the final highly concentrated extract. The process makes possible the recovery without chemical treatment of a vitamin concentrate from oils which heretofore had not been considered suitable sources for vitamin concentrates.

Although propane will be referred to hereinafter as the solvent employed it will be understood that the invention is not limited to processes employing propane in the solvent fractionation steps. The solvent must not be chemically reactive with the oil under the conditions of the process; but aside from this, it is only necessary that the solvent have a low critical temperature, preferably below 450° F.; such solvents are of substantially lower molecular weight than the oils treated, boil at much lower temperatures and are usually less dense. Furthermore, there is very little heat destruction of vitamins when such low-boiling solvents are employed. The oil must be at least partially miscible with the solvent in the so called paracritical range, the paracritical range being a range of temperature near the critical temperature of the solvent in which the miscibility of the solvent and oil decreases with temperature increases; this range usually extends from about 100° F. below the critical temperature of the solvent to a temperature a few degrees above the critical temperature of the solvent, the latter temperature being, perhaps, the critical temperature of the solvent-oil mixture. While normally liquid solvents may be employed, those which are normally gaseous and are maintained in the liquid condition during the extraction process by the application of pressure are preferred since they are easier to separate from the oil fractions. Such preferred solvents include the low-boiling hydrocarbons such as low-boiling paraffin hydrocarbons, low-boiling olefin hydrocarbons and other solvents having relatively low critical temperatures such as dimethyl ether, dichlorodifluoromethane, methyl chloride, ammonia, carbon dioxide etc. The low-boiling hydrocarbons are advantageous because of their stability and non-reactivity with the oil. While normally liquid paraffin hydrocarbons may be employed, the lower boiling normally gaseous paraffins are preferred for reasons given above. Among these, propane is desirable because of its high degree of miscibility with the oils normally treated at relatively low temperatures and because of the low pressure required to maintain it in liquefied condition.

The invention is adapted to be used in a continuous process employing two solvent fractionation towers, the extract phase in the first tower being subjected to destearinizing before being introduced into the second tower for final fractionation. The process is equally well adapted to a less elaborate plant in which only one solvent fractionation tower is employed. In such a plant a single tower is used in alternate periods for the first and second solvent extraction steps. The original oil is continuously charged for a suitable period to the first solvent fractionation tower as the first solvent fractionation step. The extract from this step may be stored prior to destearinizing but it is preferred to continuously destearinize the extract as it comes from the first fractionating step and to then store the destearinized extract for the balance of the first period. At the close of this period, the tower is washed with solvent, the piping circuit is altered to charge the tower with destearinized extract oil instead of original oil, and controls are adjusted to the new conditions necessary for the preparation of the final concentrated extract.

The application of the process in a continuous system employing two towers is illustrated in the accompanying drawing in which the solvent fractionation tower in the first fractionation step is indicated by the numeral 10 and the solvent fractionation tower for the final fractionation step is indicated by the numeral 11, the piping and equipment therebetween being employed for the various purposes of solvent separation, reflexing, chilling settling, filtering, repulping, washing, and for various alternative modes of operation as will be described in detail hereinafter.

The charge oil enters the system at 12, and, after being mixed, if necessary, with an alkali solution admitted through pipe 12a and propane supplied through lines 14 and 13, it is passed to a mixer 15 and then to a neutralizing tower 16. The free fatty acids present are precipitated as soaps by neutralization with the alkali and settle out in tower 16 from which the soaps may be withdrawn via pipe 17. Any alkali suitable for neutralizing fatty acids may be employed; caustic soda or potash being preferred for the purpose. The neutralized oil washed if necessary by the addition of further propane through line 18, is drawn overhead through line 19 and pumped by means of pump 20 into first fractionation tower 10.

Propane, introduced into the lower end of tower 10 through line 21 from propane supply line 14 flows upwardly through tower 10 past the downwardly flowing oil under temperature and pressure conditions and at a ratio of propane to oil adapted to dissolve substantially all of the oil or only the most soluble components thereof, depending upon the operating conditions which may be determined experimentally to provide the desired results in the case of the particular oil being treated. Conditions within the tower are adapted to produce two phases, an extract phase containing a relatively high proportion of solvent and relatively more of the more soluble components of the oil, and a raffinate phase containing a relatively small portion of solvent and relatively more of the less soluble components of the oil. The establishment of these two phases occurs in that part of the tower which lies between the point of introduction of oil through line 19 and the lower end, at which propane is introduced. Only that portion of the oil which enters the extract phase is carried above oil charging line 19 into the upper portion of the tower.

In the upper portion of the tower the process of rectification occurs. Conditions are established within the tower such that the solubility of the oil components diminishes with elevation and there are successive precipitations at various levels of less soluble components in the extract phase and successive redissolvings of some of the more soluble components in the precipitated material as it flows downwardly through the rectification zone. Several methods for producing this gradient in solubility may be employed either in the alternative or jointly. One preferred method of causing the miscibility in the upper portion of tower 10 to diminish with increasing elevation is to establish a gradient of temperature increasing toward the top of the tower. This may be readily accomplished by heating means 22 and 23. If desired, heating means may be employed to establish a temperature gradient throughout the entire length of the tower or for any part thereof. A second method of establishing a solubility gradient within the tower involves an operation known as refluxing, which is analogous to refluxing in fractional distillation. The extract phase is withdrawn from the tower through line 24. All or part of it is passed through a reducing valve 25 to an evaporator 26 in which a substantial part of the solvent is flashed off through overhead line 27, which carries it to propane storage for reuse in the process. A modified extract phase, substantially reduced in solvent content, is precipitated in the lower part of evaporator 26 and is withdrawn through line 27 to a chilling and settling chamber 28, which is used in the destearinization step as will be described in detail hereinafter. A part of the modified extract phase may be recycled through line 29 by means of pump 30 to the upper part of tower 10. The oily phase thus introduced to the top of tower 10 flows downwardly from one fractionating tray to the next, altering in composition as it descends and in turn altering the composition of upflowing extract phase as each successive set of equilibrium conditions is encountered at each successive level in the tower in the path of the descending oil. This process, known as refluxing, has a rectifying effect upon the oppositely flowing phases somewhat like that resulting from the establishment of a temperature gradient. Other methods of establishing rectification conditions in the upper part of tower 10 will be apparent to those familiar with the art.

The principal destearinization step occur in chiller 28, which may be cooled either by external refrigerating means or by auto-refrigeration means resulting from the flashing of propane from the propane-oil mixture introduced from line 27. The pressure reduction valve 31 is provided for the latter method. Since it may be necessary to have a greater propane content in that portion of the extract which is to be destearinized than in that portion which is to be used as reflux liquid, line 32 by-passing evaporator 26 is provided for example, it is recommended that the mixture to be destearinated contain less than 5 volumes of solvent per volume of extract oil, whereas the reflux to either fractionation tower should contain less than 2 volumes of solvent per volume of oil. Thus, a predetermined amount of extract phase rich in propane, may be passed through line 32 in a quantity determined by the setting of valve 33 to be mixed with the modified extract phase in line 27 before its introduction into chiller and settler 28. The propane flashed off in chiller and settler 28 is removed at 34 and piped by means not shown to propane storage for reuse in the process. The modified extract phase, from which all or substantially all of high melting point materials have settled, is withdrawn from the upper portion of chiller and settler 28 through line 35 and pumped by means of pump 36 into second solvent fractionation tower 11.

In solvent fractionation tower 11 the destearinized extract of the first solvent fractionation is subjected to a final and highly discriminating fractionation in order to finally concentrate a vitamin oil of high potency. Propane for fractionation tower 11 is supplied at the lower end thereof through line 37 which communicates with propane supply line 14. The extract and raffinate phases are withdrawn from tower 11 at its upper and lower ends respectively at 38 and 39. Solvent separating means 40 is provided for separating the extract phase from tower 11 into propane, which is withdrawn at 41 to be recycled to propane storage, and an extract oil, which is withdrawn through line 42. If desired, a part of the extract oil may be recycled as reflux through valve 43 and line 44 to the upper part of tower 11 by means of pump 45. Fractionation within tower 11 may be assisted by a gradient in temperature created in the tower by heating means 11$a$, and 11$b$. Depending on the vitamin potency of the raffinate withdrawn from the second fractionation via line 39, this raffinate may be recycled as reflux to the top of first fractionation tower 10 or as feed to a lower point in said tower. Moreover, it may be employed as a medium or low order concentrate for animal feeds or other purposes.

For best results, it is recommended the second fractionation be carried out at substantially higher temperatures than the first fractionation. Accordingly, the temperatures in various levels in tower 11 should be higher than in corresponding locations in tower 10 by at least 2° F. and preferably more.

The relatively high melting point substances precipitated by chilling to between about −40° F. and about 40° F. and settling in the chilling and settling means 28 almost always will be found to contain an important amount of vitamin oil. Some means must therefore be found to further separate the occluded oil from the precipitated stearin and other high melting point substances. Several such means are illustrated in the preferred apparatus and may be used together or in the alternative. The precipitate may be removed from chilling means 28 in slurry form through line 46 to a filter 47. The filtrate oil may be transmitted through valve 48 to line 35 in order to be conveyed to tower 11 for the second solvent fractionation step. The stearin may be then withdrawn from filter 47 through line 49 to be used as a product or to be further treated for further removal of vitamin-containing oil. Such further treatment may consist of reslurrying, repulping, or partially dissolving the precipitate in settler 51 with additional solvent from line 50, said solvent being sufficiently cold to avoid redissolving the precipitate to any appreciable extent. The washed precipitate may then be withdrawn from repulping and washing settler 51 through pipe 52; the extract oil, mixed with the wash solvent, being withdrawn through line 53 and added to destearinized extract of the first solvent fractionation in line 35 to be carried thereby to the second solvent fractionation step, being heated (by means not shown) before introduction into the tower. Either the precipitate from chiller and settler 28 or that from filter 47 may be diverted through line 54 or valve 55 respectively to be introduced into tower 10 as reflux at any desired point, for instance at 56, 57 or 58, the necessary pressure increase being provided by pump 59.

In some cases it may be desirable to wash the pricipitate in settler 51 with relatively warm solvent so that some of the precipitate is redissolved therein. If this is done, however, it is preferred that the wash solvent withdrawn through line 53 be diverted to tower 10 instead of to tower 11. Otherwise, stearin would be reintroduced into the destearinized extract phase.

Fatty acids should not be allowed to build up in the system, since they are more soluble in propane than glycerides. Therefore, it may be necessary, especially where there has been no neutralization of fatty acids in the oil prior to fractionating, to neutralize the entire overhead from initial fractionation tower 10 and settle out the resulting soaps in accordance with the teachings of my co-pending application Serial No. 146,229, filed February 25, 1950, now abandoned.

In both towers, the propane should be charged at a rate of more than 25 volumes per volume of original or extract oil feed. Preferably this charging ratio is maintained at 50 to 100 or more volumes of solvent per volume of oil, since greater efficiency is realized with such proportions of solvent. The rectified extract phases taken overhead should contain 12 or more volumes of solvent per volume of extract oil. As for reflux rates, one-third or more parts of oil refluxed per part of oil charged as feed is recommended for all towers. In addition, the oil concentration should be higher in the reflux liquid than in the overhead extract; hence the reflux usually runs from 0.4 to 2.0 volumes of solvent per volume of extract oil therein.

Also, the term "stearin" is employed herein in its commercial sense denoting a range of saturated glycerides rather than triglyceryl stearate alone.

The expression "substantially all of the vitamins" as used herein denotes a heavy preponderance of the vitamin compounds in question. In general, it means 90% or more; but it is also intended to include 75% or higher recoveries of vitamins where high concentrations are effected. It will be noted that except for the usual loss of vitamins from heat and oxidation, the only vitamin loss occurs in the bottoms or raffinate phase leaving the initial fractionation tower. Efficiency and economic reasons dictate a good recovery in the overhead taken off of the first fractionation tower. However, if market conditions should create a demand for rather weak vitamin oils, say of 1,000 U. S. P. vitamin A units per gram or less, it would be a simple matter to readjust the conditions in the first fractionation tower to provide a raffinate of such potency, containing perhaps 50% of the vitamin A input to the tower, while continuing to prepare a high order concentrate from the overhead fraction.

In the vast majority of cases, the final vitamin concentrate will be recovered in the extract phase of the second fractionation. However, it is conceivable that a vitamin-containing oil might be discovered or synthesized which would have other constituents of greater solubility in the selected solvent than the vitamins, even after the elimination of stearin. In such a case the second fractionation step would be carried out with the temperatures within the fractionation zone adjusted to a point in the paracritical range which would fractionate the oil into a lower fraction having a greater vitamin concentration than the upper fraction; in short, the vitamin concentrate would be recovered in the raffinate of the second fractionation instead of from its extract phase. Due to the destearinization of the first extract, this second raffinate phase would have no more than a minor content of stearin.

A further understanding of the invention will be obtained by reference to the following examples of the preparation of vitamin A concentrates from low-potency marine oils. Example I is illustrative of the general principles of the invention.

All vitamin A potencies are set forth on the basis of unsaponifiable matter. Although, this basis is considered the soundest one; nevertheless these determinations are of limited precision which accounts for a substantial part of the discrepancies in vitamin inputs and outputs at various stages in the examples.

*Example I*

At a point 36 feet below the top of a combined extract and rectification tower 60 feet high and having an inside diameter of 3 inches, a commercial cod liver oil with a vitamin A potency of 2,000 U. S. P. units and a stearin content of about 15% by weight is charged at a rate of approximately 4,000 cc. per hour. Meanwhile, propane solvent is admitted 58 feet below the top at a solvent to oil ratio by volume of 50:1. Heating is employed to maintain a temperature of about 192° F. in the upper part of the tower and about 185° F. in the lower part. The temperatures employed are generally between about 160 and 200° F.; and preferably a differential of between 5 and 10° F. is established between the top and bottom of the tower. Where a relatively small overhead is desired, the two temperatures will be nearer 200° F.; whereas for a larger overhead, both top and bottom temperatures will be nearer 160° F. The tower is maintained at a pressure of about 600 pounds per square inch which is about 40 to 50 pounds per square inch above the vapor pressure of the solvent at the highest temperature encountered within the tower in order to prevent the formation of vapor. After establishing equilibrium conditions over a test period of about 72 hours, the oil feed is fractionated into an overhead extract of approximately 3 weight percent of the charge oil, and a bottoms raffinate amounting to approximately 97%. Upon evaporating the propane from a sample of the extract oil, it will be found to have a vitamin A potency of about 58,000 U. S. P. units per gram and a stearin content of approximately 25 weight percent, while the oil in the raffinate will run about 150 U. S. P. units per gram.

The extract phase is then flashed to a lower temperature and pressure to evaporate most of the solvent. In some instances, especially where a larger overhead is taken, it will be found desirable to return a substantial portion of the desolventized oil to the upper end of the tower as a reflux. In the case of the present oil charging rate of 4,000 cc. per hour, a reflux of 2,000 cc. of extract oil per hour is recommended.

After evaporation of the solvent to a point where the extract solution has an oil content of about 25% by volume, this solution is passed into a chiller and separator maintained at a temperature in the neighborhood of −20° F. In this destearinization operation, 15 to 25 weight percent of the oil is precipitated and separated.

Next, the precipitated stearin is washed twice with an equal volume of cold fresh propane. The propane washes contain a small amount of oil; hence they are added to the extract solution leaving the chiller.

The destearinized extract is then subjected to a second fractionation with propane in the same fractionating tower. In this instance the propane:oil ratio is again about 50:1 by volume and the temperatures at the bottom and top of the tower are maintained substantially constant at 190° F. and 197° F. respectively. The extract fraction taken overhead here amounts to about 15% by weight of the oil introduced from the destearinization stage into the tower and the bottoms which contain the remaining 85% are also withdrawn. After removal of the propane the bottoms contain approximately 20,000 vitamin A units per gram of the oil. This material is suitable for marketing as a low order concentrate or for reintroduction along with fresh oil feed to the initial fractionation. In either event, a high vitamin recovery efficiency of the order of 90% is realized. Upon evaporating the solvent from the extract solution taken overhead, the oil extract will be found to be substantially free of stearin and have a vitamin A potency varying between 340,000 and 380,000 U. S. P. units per gram.

*Example II*

A similar commercial cod liver oil with a vitamin A content of 2,050 U. S. P. units per gram was charged at rates varying from 938 up to 1,824 grams per hour to a fractionation apparatus consisting of two vertical 18 foot towers of 2 inches internal diameter. These towers were arranged in series in such manner as to be directly comparable to a single 32′ tower in which the reflux was introduced 4′ below the top, the oil feed 20′ below the top and the propane 32′ below the top. This arrangement was equivalent to a 12′ high extraction or stripping zone located below a 20′ high rectification zone. Propane was introduced at a steady rate of 50,500 grams per hour which gave volumetric propane to oil ratios ranging from 50.7 up to 98.9:1. During the run, the temperature was substantially constant throughout the length of the tower and was kept between 170 and 173° F. In general, equilibrium conditions were maintained and the pressure was held at 475–500 pounds per square inch gage (p. s. i. g.). In a neutralizing step prior to the initial fractionation, fatty acids amounting to 2.0 weight per cent of the original oil were neutralized and settled out as soaps. A minor portion of the extract phase taken overhead was taken off as the first intermediate product while the remainder was concentrated by evaporation of solvent until the propane content was reduced to about 43% by volume. The latter concentrated liquid was returned to the tower at rates varying between about 2,140 and about 2,575 grams of oil per hour. The extract oil contained in this intermediate product amounted to 21.4% of the cod liver oil charged and was found to have a vitamin A content of 8,140 U. S. P. units per gram; therefore, the vitamin A recovery in this stage was 85.4%. The bottoms or raffinate phase amounted to 76.6% by weight of the oil feed and had a vitamin A potency in the 100–300 U. S. P. units range.

After the first fractionation was completed, the overhead or extract phase from the first extraction-rectification was again fractionated with propane. Here the initial extract solution was charged at a rate of 918 grams of oil per hour, while the propane was charged at a steady rate sufficient in conjunction with the propane content of the extract solution to supply 50,500 grams of solvent per hour thereby providing a volumetric propane:oil charging ratio of 100.9:1. Upon establishing equilibrium conditions with the tower at 188° F. and 570 p. s. i. g., the reflux was 2,980 grams per hour of extract oil, and the propane to oil ratio of that stream was 0.4:1. This reflux stream was obtained as before by withdrawing most of the overhead fraction and evaporating off most of its solvent content. The remainder of the overhead or extract phase constituted the second intermediate product; it contained 8.0 weight per cent of the initial extract oil and when freed of solvent was found to have a vitamin A content of 80,200 U. S. P. units per gram. The remaining 92% of the initial extract oil appeared in the bottoms or raffinate phase, and a vitamin A determination of the oil in that fraction indicated the potency to be 910 U. S. P. units per gram. This fraction was thought to be suitable for recycling to the initial fractionation. After removal of the propane, the second intermediate product or rectified extract oil was mixed with several volumes of pentane and destearinized twice by chilling to a maximum 20° C. and filtering off the precipitated stearin. In both instances, the stearin cake was repulped and washed in pentane. The stearin removed in this treatment amounted to 38.3% by weight. Upon evaporation of the pentane, the remaining 61.7% of the second rectified extract oil was recovered. This material was found to have a vitamin A potency of 114,300 U. S. P. units per gram, which was equivalent to an 87.7% vitamin A recovery in the double destearinization.

Although Example II was conducted under somewhat different conditions than prevailed in Example I; nevertheless, except for the stage in which the destearinization was performed, the conditions are considered generally comparable, although slightly more favorable in the process of Example II. Accordingly, it is apparent that the results of the present invention cannot be obtained either by two solvent fractionations alone, or by two solvent fractionations followed by a destearinization treatment.

Since certain changes may be made in carrying out the above process without departing from the scope of the invention, it is intended that all matter contained in the above description shall be interpreted as illustrative and not in a limiting sense. For example, second raffinate phase may be recirculated to the first fractionation zone.

I claim:

1. A method for preparing a high potency vitamin concentrate from a low potency marine oil containing stearins, which method includes the steps of: continuously contacting said oil with a solvent having a critical temperature not substantially higher than 450° F. in a first vertically extended counter-current fractionation zone at temperatures in a range near the critical temperature of the solvent-oil mixture in which miscibility decreases with increasing temperature; maintaining temperatures within said range of temperatures but sufficiently low to dissolve at least 3% and not more than 10% of said oil in a primary extract phase containing most of the solvent and vitamins; flowing said primary extract phase upwardly through said zone, withdrawing it from the upper region thereof, and reducing pressure on said withdrawn primary extract phase to evaporate said solvent at least sufficiently to reduce the ratio of solvent to oil to less than 5 volumes of solvent to one volume of extract oil; chilling said extract phase at least in part by said evaporation to a temperature between $-40°$ F. and $10°$ F. to precipitate stearins; separating said precipitated stearins from said chilled extract phase; introducing said destearinized extract phase into a second vertically extended counter-current fractionation zone and contacting it with additional quantities of said solvent sufficient to increase the ratio of solvent to oil in said zone to at least 25 volumes of solvent to one volume of oil; maintaining temperatures in the upper region of said second fractionation zone at least $2°$ F. higher than the temperatures in the upper region of said first fractionation zone; withdrawing a secondary extract phase from said second fractionation zone and recovering a vitamin concentrate therefrom.

2. A method for preparing a high potency vitamin concentrate from a low potency marine oil containing stearins, which method includes the steps of: continuously contacting said oil with a solvent having a critical temperature not substantially higher than $450°$ F. in a first vertically extended counter-current fractionation zone at temperatures in a range near the critical temperature of the solvent-oil mixture in which miscibility decreases with increasing temperature; maintaining temperatures within said range of temperatures but sufficiently low to dissolve at least 3% and not more than 10% of said oil in a primary extract phase containing most of the solvent and vitamins; flowing said primary extract phase upwardly through said zone and withdrawing it from the upper region thereof, and reducing pressure on said withdrawn primary extract phase to evaporate said solvent at least sufficiently to reduce the ratio of solvent to oil to less than 5 volumes of solvent to one volume of extract oil; chilling said extract phase at least in part by said evaporation to a temperature between $-40°$ F. and $10°$ F. to precipitate stearins; separating said precipitated stearins from said chilled extract phase; introducing said destearinized extract phase into a second vertically extended counter-current fractionation zone and contacting it with additional quantities of said solvent sufficient to increase the ratio of solvent to oil in said zone to at least 25 volumes of solvent to one volume of oil; maintaining temperatures in the upper region of said second fractionation zone at least $2°$ F. higher than the temperatures in the upper region of said first fractionation zone to fractionate said primary extract into a secondary extract of maximum vitamin concentration and a secondary raffinate having a vitamin concentration higher than said original oil; recycling at least part of said secondary raffinate from said second fractionation zone to the upper part of said first fractionation zone; withdrawing said secondary extract phase from the upper region of said second fractionation zone and recovering a vitamin concentrate product therefrom.

3. A method for preparing a high potency vitamin concentrate from a low potency marine oil containing stearins, which method includes the steps of: continuously contacting said oil with hot propane in a first vertically extended counter-current fractionation zone under liquifying pressure; maintaining temperatures in said zone in a range between about $160°$ F. and $200°$ F. and adjusted within said range to fractionate said oil into a primary extract phase comprising between 3% and 8% of the oil, and a downflowing raffinate phase; withdrawing said primary extract phase from the upper part of said first fractionation zone and flashing off said propane to reduce the solvent content to not more than 5 parts of propane to one part of oil; chilling said extract phase at least in part by said flashing to a temperature between $-40°$ F. and $10°$ F. to precipitate stearin; separating said stearin precipitate from said extract phase and introducing said destearinized primary extract phase into a second counter-current fractionation zone and contacting said primary extract phase with sufficient additional propane to increase the solvent content to at least 25 parts of solvent to one part of oil extract; maintaining temperatures in the upper part of said second fractionation zone at least $2°$ F. higher than corresponding temperatures in said first fractionation zone; withdrawing a secondary extract phase from the upper part of said second fractionation zone and recovering a vitamin concentrate product from said secondary extract phase.

4. A method for preparing a high potency vitamin concentrate from a commercial cod liver oil, which method includes the steps of: continuously contacting said oil with a solvent comprised of normally gaseous hydrocarbon in a first vertically extended counter-current fractionation zone at temperatures in a range near the critical temperature of the solvent-oil mixture in which miscibility decreases with increasing temperature; maintaining temperatures within said range of temperatures but sufficiently low to dissolve at least 3% and not more than 8% of said oil in a primary extract phase containing most of the solvent and vitamins; flowing said primary extract phase upwardly through said zone and withdrawing it from the upper region thereof, and reducing pressure on said withdrawn primary extract phase to evaporate said solvent at least sufficiently to reduce the ratio of solvent to oil to less than 5 volumes of solvent to one volume of extract oil; chilling said extract phase at least in part by said evaporation to a temperature between $-40°$ F. and $10°$ F. to precipitate stearins; separating said precipitated stearins from said chilled extract phase; introducing said destearinized extract phase into a second vertically extended counter-current fractionation zone and contacting it with additional quantities of said solvent sufficient to increase the ratio of solvent to oil in said zone to at least 25 volumes of solvent to one volume of oil; maintaining temperatures in the upper region of said second fractionation zone at least $2°$ F. higher than the temperatures in the upper region of said first fractionation zone; withdrawing a secondary extract phase from said second fractionation zone and recovering a vitamin concentrate product therefrom.

5. A method for preparing a high potency vitamin concentrate from a commercial cod liver oil, which method includes the steps of: contacting said oil with aqueous alkali solution to precipitate soap in the presence of normally gaseous hydrocarbon to form a mixture of oil, solvent, and precipitated soap; introducing said mixture into a first vertically extended counter-current fractionation zone and fractionating said mixture with said solvent at temperatures in a range near the critical temperature of the solvent-oil mixture in which miscibility decreases with increasing temperature; maintaining temperatures within said range of temperatures but sufficiently low to dissolve at least 3% and not more than 8% of said oil in a primary extract phase containing most of the solvent and vitamins; flowing said primary extract phase upwardly through said zone and withdrawing it from the upper region thereof; evaporating solvent from said withdrawn primary extract phase at least sufficiently to reduce the ratio of solvent to oil to less than 5 volumes of solvent to one volume of extract oil; chilling said extract phase at least in part by said evaporation to a temperature between $-40°$ F. and $10°$ F. to precipitate stearins; separating said precipitated stearins from said chilled extract phase; introducing said destearinized extract phase into a second vertically extended counter-current fractionation zone and contacting it with additional quantities of said solvent sufficient to increase the ratio of solvent to oil in said zone to at least 25 volumes of solvent to one volume of oil; maintaining temperatures in the upper region of said second fractionation zone at least 2° F. higher than the temperatures in the upper region of said first fractionation zone; withdrawing a secondary extract phase from said second fractionation zone and recovering a vitamin concentrate product therefrom.

References Cited in the file of this patent

UNITED STATES PATENTS

| | | |
|---|---|---|
| 2,288,441 | Ewing | June 30, 1942 |
| 2,380,418 | Dombrow | July 31, 1945 |
| 2,394,968 | Van Orden | Feb. 12, 1946 |
| 2,499,991 | Dickinson | Mar. 7, 1950 |
| 2,546,132 | Palmer | Mar. 20, 1951 |
| 2,573,902 | Gloyer | Nov. 6, 1951 |